United States Patent [19]

Killmeyer

[11] 4,194,873

[45] Mar. 25, 1980

[54] APPARATUS FOR MAKING PULTRUDED PRODUCT

[75] Inventor: Charles W. Killmeyer, Pittsburgh, Pa.

[73] Assignee: PPG Industries, Inc., Pittsburgh, Pa.

[21] Appl. No.: 867,852

[22] Filed: Jan. 9, 1978

[51] Int. Cl.² ............................................. B29G 7/00
[52] U.S. Cl. .................................... 425/93; 425/102; 425/106; 425/112; 425/334; 425/391
[58] Field of Search ............... 264/103, 136, 137, 174, 264/295; 425/94, 102, 106, 112, 334, 391, 93

[56] References Cited

U.S. PATENT DOCUMENTS

| | | | |
|---|---|---|---|
| 2,779,388 | 1/1957 | Quoss | 425/106 |
| 3,283,050 | 11/1966 | Boggs | 264/137 |
| 3,374,132 | 3/1968 | Boggs | 264/137 X |
| 3,441,637 | 4/1969 | Davis | 264/295 X |
| 3,501,562 | 3/1970 | Onoyama | 264/137 |
| 3,657,040 | 4/1972 | Shobert | 264/137 X |
| 3,703,396 | 11/1972 | La Manche | 264/137 X |
| 3,895,896 | 7/1975 | White | 264/137 |
| 3,983,668 | 10/1976 | Hassman | 264/137 X |

Primary Examiner—Thomas P. Pavelko
Attorney, Agent, or Firm—Paul A. Leipold; John E. Curley; Alan T. McDonald

[57] ABSTRACT

A continuous fiber reinforced pultruded rod-like reinforcing element is disclosed. This rod-like element includes at least one groove and/or protrusion along its length, with the continuous reinforcing fibers in the protrusions or surrounding the grooves generally conforming to the pattern of the outer surface of the rod. Preferably, the protrusions and/or grooves form a generally helical pattern on the surface of the rod. The rods formed by the instant invention have utility in reinforcing such structures as concrete, mine roofs, plastics and the like. Also disclosed are methods and apparatus for producing these stock materials.

10 Claims, 9 Drawing Figures

APPARATUS FOR MAKING PULTRUDED PRODUCT

BACKGROUND OF THE INVENTION

Reinforcing members formed of fiber reinforced organic resins are quite valuable because of their high strength to weight ratios. Thus, fiber reinforced members having uniform surfaces are typically employed in the reinforcement of concrete, plastics and the like.

A problem associated with the reinforcement of materials such as concrete with fiber reinforced resinuous rods is the lack of a mechanical bond between the concrete and exterior surface of the rod. Thus, it is desirable to form a reinforcing member having one or more grooves and/or protrusions on its surface to provide regions for mechanical bonding between the rod surface and the material or matrix to be reinforced.

However, with the known techniques for forming continuous fiber reinforced plastics, the molding of ridges and/or grooves into a reinforcing member severely reduces the strength of the member. In the past, in order to provide ridges or grooves on the surface of a continuous fiber reinforced member, the continuous fibers would be severely bent into the ridges or out of the grooves from their normal longitudinal position along the rod resulting in ridges which have a scarcity of fiber reinforcement therein or reinforcement in an undesired direction. In either case, the reduced amount of continuous fiber reinforcement or the severely bent fibers in the ridges or the reorientation of fibers to form the grooves in the surface substantially reduces the strength of the member at these points. Typical of the prior art reinforcing members having uneven surfaces are those found in U.S. Pat. Nos. 2,510,693; 2,949,054; and 3,859,409.

It is desirable, therefore, to produce a fiber reinforced, resinous rod-like reinforcing member in which one or more grooves and/or ridges are provided on the surface of the rod along its length to provide mechanical bonding between the reinforcing member and the material or matrix to be reinforced and in which the reinforcing fibers in the ridges or surrounding the grooves generally follow the pattern of the ridges and grooves on the surface of the rod to provide higher strength to the reinforcing member than has been previously possible. These grooves and/or ridges are continuous and preferably generally helical in configuration.

Pultrusion is a known method for producing continuous fiber reinforced organic resin articles having uniform shapes along their length. Typical of the known pultrusion processes are those found in U.S. Pat. Nos. 2,721,599; 2,625,498; 3,895,896; and 3,979,493. An inherent problem of the known pultrusion methods is their inability to form shaped articles having other than a regular longitudinal shape. Pultrusion is, however, because of its continuous nature, an effective way of producing continuous fiber reinforced stock materials. It would be highly desirable, therefore, to provide a pultrusion method and apparatus capable of producing articles having shapes other than the uniform longitudinal shapes commonly associated with pultrusion.

THE PRESENT INVENTION

By means of the present invention, a pultruded stock material is produced having the desired characteristics of both an irregular surface for mechanical bonding strength and continuous fiber reinforcement following the irregularities on the surface along the length of the rod for increased tensile strength.

The pultruded rod stock has one or more grooves and/or protrusions along its surface. These grooves and/or protrusions form a continuous and preferably a generally helical pattern around the rod. Each protrusion has a plurality of continuous fiber reinforcements in it and following its pattern around the surface of the rod stock and each groove has a plurality of continuous fiber reinforcements surrounding it and following its pattern around the surface of the rod stock. Thus, at any point along the length of the rod, the same fiber reinforcements will be found in the protrusions or surrounding the grooves. The rods of the present invention thus include continuous fiber reinforcements in a generally longitudinal orientation along the rod which follows the contours of the protrusions and/or the region surrounding the grooves which they reinforce.

The method for producing this article comprises passing fiberous reinforcements through a means for coating them with resin, such as a resin bath, pulling the resin coated fibers through a first die thus forming the irregular cross-sectional shape, passing the shaped composite through a partial curing means for the reinforcement/resin composite rod, pulling the partially cured rod through a second die, a second complete curing means and a third die, rotating said third and optionally said second dies to form the pattern of the grooves and/or protrusions on the surface and finally curing the glass/resin composite in said complete curing means.

The apparatus for producing this article comprises a resin coating means, such as a resin bath, a partial curing means, a complete curing means and a plurality of dies, with certain of the dies being equipped to rotate and produce the patterned grooves and/or protrusions on the surface of the rod stock.

BRIEF DESCRIPTION OF THE DRAWINGS

The invention will be more fully described with reference to the drawings in which.

DETAILED DESCRIPTION OF THE DRAWINGS

Figure 1:
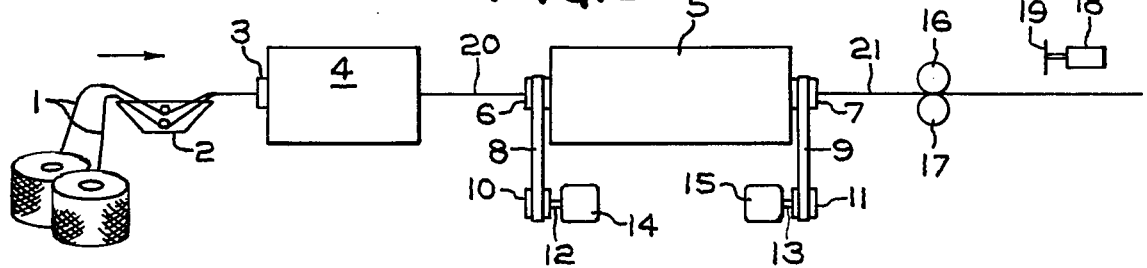
FIG. 1 is a schematic diagram illustrating a first embodiment of the method and apparatus employed in the present invention.

Turning to FIG. 1, fiberous reinforcements 1 are initially passed through a means for coating the fibers with resin, such as a resin bath 2. The fibers can be of any of the known reinforcement fibers, such as glass, Kevlar, nylon, polyester, carbon, graphite, amides, imides and the like and may be formed of combinations of these fibers, to give specific desired properties. The resins may be either thermoset of thermoplastic. Preferably, however, thermoset resins are employed. Typical thermoset resins which may be employed include polyesters, polyurethanes, vinyl esters, epoxys and the like. Typical thermoplastic resins which may be employed include nylons, polyethylenes, polypropylenes, polystyrenes and the like. If desired, the resin bath 2 may include a heater to maintain the temperature of the resin in the bath.

The resin coated fibers are then passed through an initial die 3. This die takes the shape of the cross-section of the final rod to be formed and thus shapes the reinforcement/resin composite. After passing through the die 3, the coated fibers, now as a generally shaped and unified mass, are passed through a partial cure means 4. In the case of thermoset resins, this partial cure means 4 is a partial dry oven, such as a hot air oven, infrared oven or the like. In the case of thermoplastic resins, the partial dry means 4 will be a cooling chamber.

The now partially cured rod 20 leaves the partial dry means 4 and enters die 6. Again, this die takes the shape of the cross-section of the rod being produced. Preferably, this die is rotated by means such as belt 8 connected to pulley 10 which is in turn connected by the shaft 12 to motor 14. Alternate means for driving die 6 may be employed, such as gear drive, chain drive and the like. This die, like die 3 can be, however, a stationary die. After passing through the die 6, the partially cured rod 20 enters a second curing means 5. The curing means 5 completes the curing of the resin and produces a hardened rod. Similar to partial dry means 4, in the case of thermoset resins, a heating oven, such as a hot air oven, infrared oven or the like, is employed and in the case of thermoplastic resins a cooling zone is provided.

At the exit end of the curing means 5 is located a final die 7. This die also takes the shape of the cross-section of the rod being produced.

This die 7 is preferably rotated by means such as belt 9 connected to pulley 11 which is in turn connected by shaft 13 to motor 15. Similar to die 6, this die 7 could be rotated by alternate means, such as gear drive or chain drive.

The pattern of the completed rod 21 is produced within curing means 5. Between dies 6 and 7, and within final cure means 5, a twisting of the partially cured rod 20 takes place prior to its full cure. This twist, in combination with the shape of the dies 3, 6 and 7, which shape is selected to produce at least one protrusion and/or one groove along the surface of the rod 21, produces the one or more protrusions and/or grooves in the final rod 21.

In the preferred embodiment, dies 6 and 7 are rotated continuously to provide one or more continual and repeating helix patterns on the surface of the rod 21. When both dies 6 and 7 are rotating, they are either rotated in opposite directions, or at different speeds, or a combination of these effects, to produce the pattern in the rod. However, if desired, the rotation of die 6 and/or 7 could be intermittent or the speed of rotation of die 6 and/or 7 could be varied to produce an irregular surface to the rod 21 or a repeating but not helical pattern in the surface of the rod 21.

As the rod 21 exits die 7, the rod 21 passes between nip rolls 16 and 17. As previously stated, the present invention is a pultrusion operation. Thus, pull rolls 16 and 17 provide the force to pull the fibers 1 through the system to eventually produce rod 21.

Subsequent to passing through the pull rolls 16 and 17, the rod 21 can be cut to desired finite lengths by a cutting means such as cutter 18 having blade 19.

Figure 2:
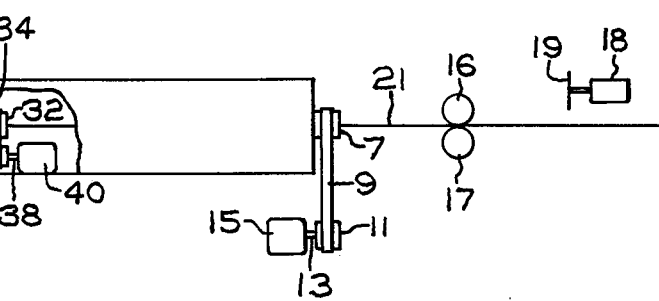
FIG. 2 is a schematic diagram illustrating a second embodiment of a method and apparatus according to the present invention.

FIG. 2 illustrates an alternate embodiment of the present invention. In this case, the fibers 1, after passing through the coating means, such as resin bath 2, and die 3, enter forming chamber 30. In the first zone of the chamber 30, the same partial cure as in partial cure means 4 of FIG. 1 occurs. Thus, partially cured rod 20 enters die 32 within the forming chamber 30. Die 32 is connected to belt 34, which is in turn connected to pulley 36 which is connected to motor 40 by means of shaft 38 to rotate this die 32. Again, other suitable connection means, such as a gear drive or chain drive may be employed to drive die 32.

After exiting die 32, partially cured rod 20 enters a second zone of forming chamber 30 where it is twisted and completely cured in the same manner as was accomplished in cure means 5 in FIG. 1. Once again, at the exit of chamber 30, die 7, which is connected by belt 9, pulley 11 and shaft 13 to motor 15, or to other suitable rotation means, and die 32 are rotated and varied in their rotations as in the embodiment of FIG. 1 to form the patterned grooves and/or protrusions along the surface of the completed rod 21.

As in the above embodiment, forming chamber 30 will be a heating means, such as a hot air oven, infrared heated oven or the like when thermoset resins are employed or a cooling means, such as a refrigerated chamber, when thermoplastic resins are employed.

As in the above embodiment, after exiting from die 7, the completed rod 21 passes between pull roll 16 and 17, which pull rolls provide the forces necessary to pultrude the rod 21, and are then cut to desired shape by cutter 18 and blade 19.

FIGS. 3, 4, 6 and 8 illustrate typical cross-section for rods formed according to the present invention. Clearly, these shapes are not the only cross-sections which may be formed by the present invention but are only illustrations of the myriad of possible cross-sections which may be manufactured according to the present invention.

Figure 3:
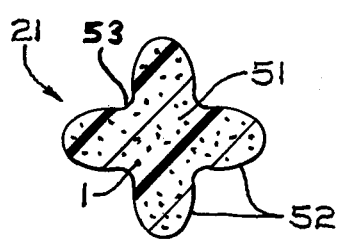
FIGS. 3 and 4 are cross-sectional views of pultruded rod stock formed in accordance with the present invention.

In FIG. 3, rod 21 includes a core 51 with a plurality of protrusions 52 and grooves 53 on the surface of the rod 21. Throughout the rod 21 are a plurality of fiberous reinforcements 1. The cross-section of the rod 21 is consistent, i.e., at any point the cross-section of the rod will be the same, except for its rotational orientation about the axis of the rod 21.

Figure 4:
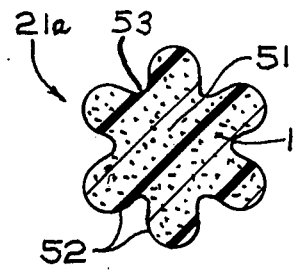
Figure 6:
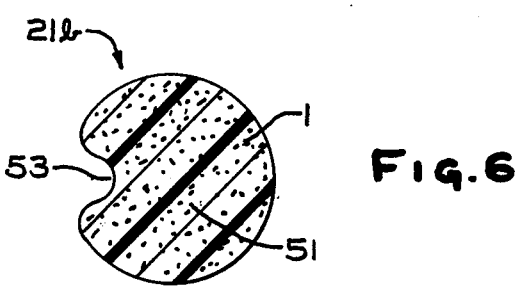
FIG. 6 is a cross-sectional view of another rod stock produced according to the present invention having a protrusion but no grooves.
Figure 8:
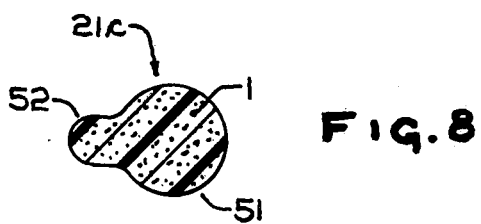
FIG. 8 is a cross-sectional view of another rod stock produced according to the present invention, having a groove but no protrusions on its surface.

FIGS. 4, 6 and 8 illustrate other typical cross-sections which the rod of the present invention may take. In the embodiment of FIG. 4, rod 21a again includes a plurality of protrusions 52 and grooves 53 around a core 51. In the embodiment of FIG. 8, a single protrusion 52 is provided with no grooves and in the embodiment of FIG. 6, a single groove 52 is provided with no protrusion.

Figure 5:
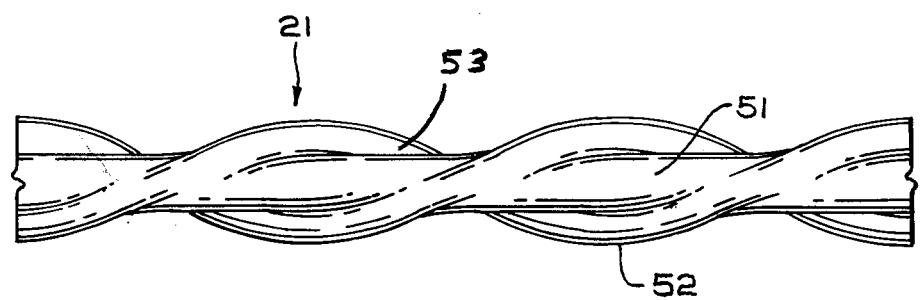
FIG. 5 is a longitudinal view of a rod stock produced according to the present invention.
Figure 7:
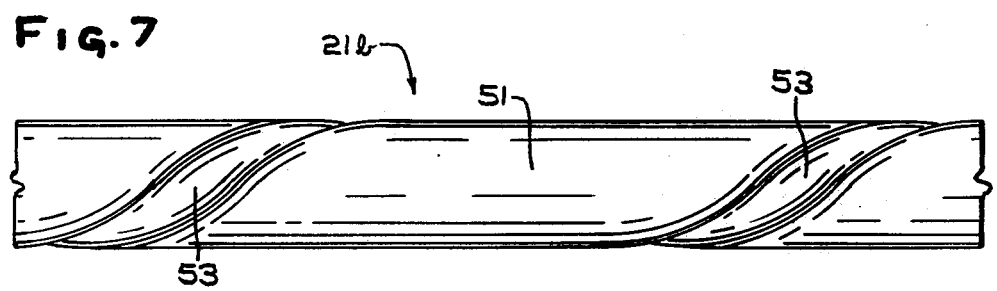
FIG. 7 is a longitudinal view of the rod stock of FIG. 6.
Figure 9:
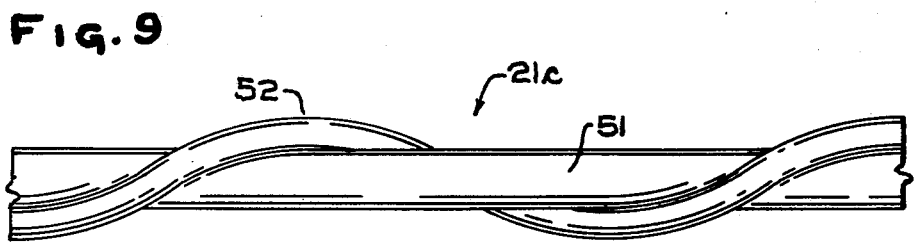
FIG. 9 is a longitudinal view of the rod stock of FIG. 8.

FIG. 5 illustrates a longitudinal view of a rod 21 of FIG. 3. In this embodiment, the preferred generally helical pattern of the grooves 53 and the protrusions 52 about the core 51 is best illustrated. These grooves 53 and protrusions 52 are locations for mechanical bonding between the rod 21 and the material or matrix to be reinforced by the rod 21, such as concrete, cementatious materials, mine roofs, plastics and the like. Likewise, the preferred generally helical pattern of a single protrusion 52 is shown in longitudinal view in FIG. 9 and a generally helical single groove is illustrated in longitudinal view in FIG. 7.

A feature of the reinforcing rod 21 of the present invention is the location of the fiber reinforcement 1 within it. In each protrusion 52, and in the area surrounding each groove 53, no matter where the rod 21 is cut along its length, the same reinforcing fibers 1 will be found in the same positions or orientation in protrusion 52, or surrounding groove 53. That is, the fibers 1 in the protrusions 52 follow the same general pattern of the protrusions 52 as they encircle the core 51 and the fibers 1 surrounding the grooves 53 follow the same general pattern of the grooves 53 as they encircle the core 51, while the fibers 1 in the core 51 of the rod 21 follow the longitudinal axis of the rod 21. The result is a rod including continuous fiber reinforcements in a generally longitudinal orientation along the rod which follow the contours of the grooves and/or protrusions which they reinforce.

Since the fiber reinforcements 1 follow the contours of the protrusions 52 and/or grooves 53, there is no necessity of forcing fibers into the protrusions 52, as has been the custom in prior irregularly surfaced fiber reinforced materials. In the present rod 21, however, forces exerted on the rod 21 are carried throughout the length of the rod 21 by the continuous lengths of fibers 1 without the fibers 1 having to take sharp bends to fit into the protrusions 52. Thus, superior tensile strengths for the rod 21 can be obtained.

From the foregoing, it is clear that the present invention provides a reinforcing rod which is useful for many reinforcement purposes. In addition, the method and apparatus of the present invention provide an easily performed method for producing these rods.

While the present invention has been described with reference to certain specific embodiments thereof, it is not intended to be so limited thereby, except as set forth in the accompanying claims.

I claim:

1. Apparatus for producing a fiber reinforced pultruded rod, comprising means for coating fibers with resin, first stationary shaping means for shaping the coated fibers into a rod with at least one groove or protrusion, means for partially curing said shaped rod, second shaping means generally shaped in the cross-section of said rod, means to rotate said second shaping means and said partially cured rod in order to form a rod with said fibers following the contour of said at least one groove or protrusion, and means to pull said rod through said first shaping means and said second shaping means.

2. The apparatus of claim 1 wherein said means for rotating said second shaping means is driven belt and pulley means.

3. The apparatus of claim 1 wherein said means for rotating said second shaping means is a driven chain means.

4. The apparatus of claim 1 wherein said means for rotating said second shaping means is a driven gear means.

5. The apparatus of claim 1 wherein said partial curing means is a hot air oven.

6. The apparatus of claim 1 wherein said curing means is an infrared oven.

7. The apparatus of claim 1 wherein said means to pull comprises a pair of pull rolls.

8. The apparatus of claim 1 further comprising means for cutting said pultruded rod into finite lengths.

9. The apparatus of claim 1 wherein said means for coating said fibers comprises a resin bath.

10. The apparatus of claim 9 wherein said resin bath includes a heater.

* * * * *